United States Patent
Chen et al.

(10) Patent No.: US 11,880,600 B2
(45) Date of Patent: Jan. 23, 2024

(54) CONSOLIDATING WRITE REQUEST IN CACHE MEMORY

(71) Applicant: Micron Technology, Inc., Boise, ID (US)

(72) Inventors: Ning Chen, San Jose, CA (US); Jiangli Zhu, San Jose, CA (US); Yi-Min Lin, San Jose, CA (US); Fangfang Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 76 days.

(21) Appl. No.: 17/446,746

(22) Filed: Sep. 2, 2021

(65) Prior Publication Data
US 2023/0067281 A1    Mar. 2, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0604; G06F 3/0659; G06F 3/0679; G06F 3/0656
See application file for complete search history.

(56) References Cited

U.S. PATENT DOCUMENTS

| | | | |
|---|---|---|---|
| 11,526,447 B1* | 12/2022 | Wu | G06F 3/0665 |
| 2013/0326149 A1* | 12/2013 | Barrell | G06F 11/1076 |
| | | | 711/135 |
| 2015/0039862 A1 | 2/2015 | Barowski et al. | |
| 2015/0067264 A1* | 3/2015 | Eckert | G06F 12/126 |
| | | | 711/133 |
| 2016/0306574 A1* | 10/2016 | Friedman | G06F 12/0802 |
| 2017/0024142 A1* | 1/2017 | Watanabe | G06F 3/0608 |
| 2019/0042413 A1* | 2/2019 | Wysocki | G06F 11/108 |
| 2021/0334038 A1* | 10/2021 | Gupta | G06F 3/0659 |

* cited by examiner

*Primary Examiner* — Tracy A Warren
(74) *Attorney, Agent, or Firm* — Lowenstein Sandler LLP

(57) ABSTRACT

A write request directed to the non-volatile memory device is received. A stripe associated with an address specified by the write request is present in the volatile memory device is determined. The volatile memory device includes a plurality of stripes, each stripe of the plurality of stripes having a plurality of managed units. The write request on a managed unit of the stripe in the volatile memory device is performed. The stripe in the volatile memory device is evicted to a stripe in the non-volatile memory device.

17 Claims, 5 Drawing Sheets

CONSOLIDATING WRITE REQUEST IN CACHE MEMORY

TECHNICAL FIELD

Embodiments of the disclosure relate generally to memory sub-systems, and more specifically, relate to consolidating write request in cache memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
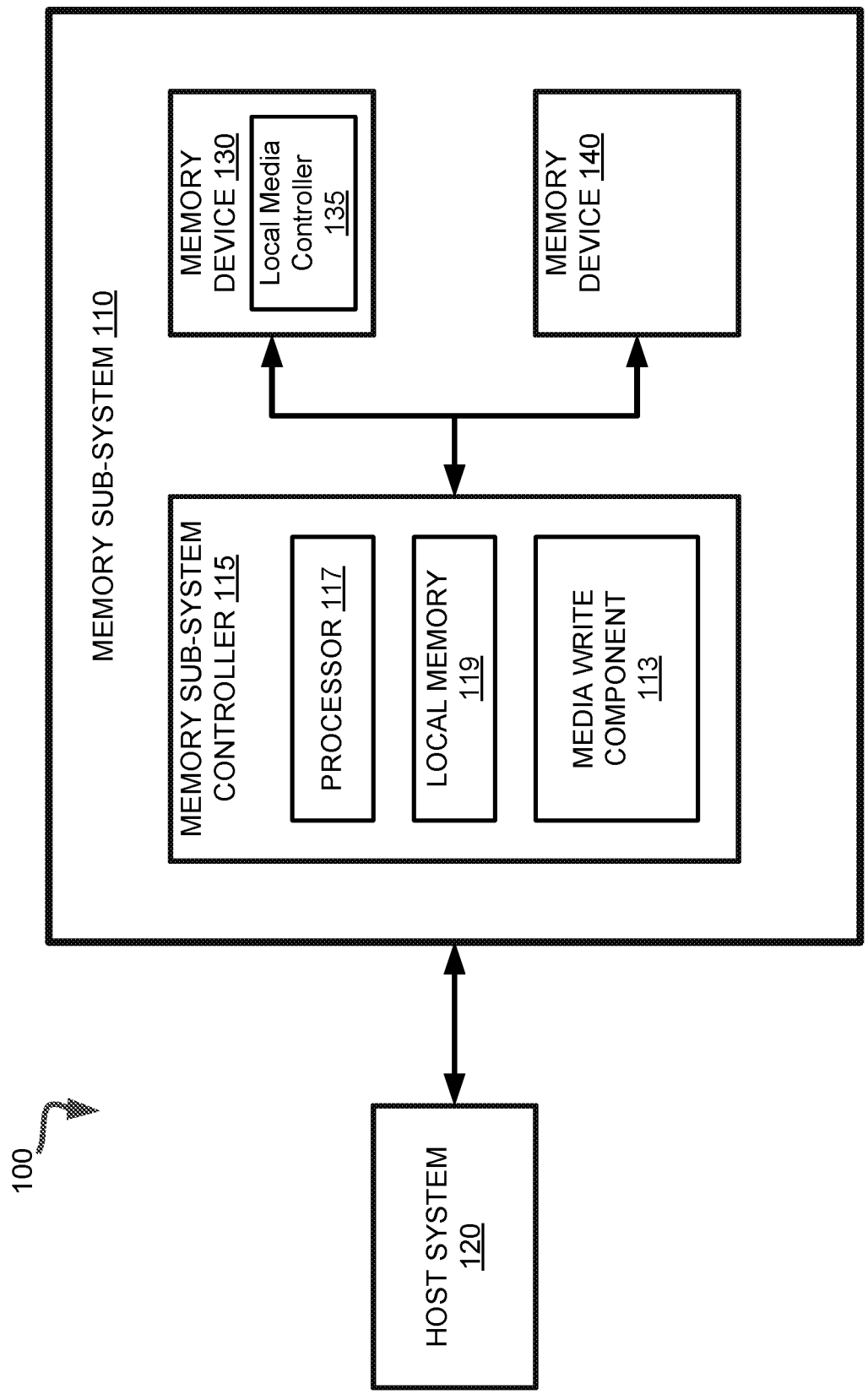
FIG. 1 illustrates an example computing system that includes a memory sub-system in accordance with some embodiments of the present disclosure.

Aspects of the present disclosure are directed to consolidating write request in cache memory. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device, which is a package of one or more dice. The dice in the packages can be assigned to one or more channels for communicating with a memory sub-system controller. The non-volatile memory devices include cells (i.e., electronic circuits that store information), that are grouped into pages to store bits of data. One example of non-volatile memory devices is a negative-and (NAND) memory device. Other examples of non-volatile memory devices are described below in conjunction with FIG. 1.

Various memory sub-systems can implement fault tolerant redundancy schemes, such as a redundant array of independent NAND (RAIN), for error checking and correction. A fault tolerant redundancy scheme can store data item in groups of pages, referred herein as fault tolerant stripes, such that each stripe includes a redundancy metadata (e.g., a parity page) storing a redundancy metadata (e.g., a XOR parity), thus enabling for the data to be reconstructed if one of the pages of the stripe fails.

In order to maintain the ability to reconstruct the pages of the fault tolerant stripes, the redundancy metadata can be updated concurrently with performing any write operation on the fault tolerant stripe. In some implementations, a read-modify-write operation can be performed on the fault tolerant stripe. Accordingly, to write data item to the memory device, data is read from the page where the data item is to be written as well as the redundancy metadata associated with the fault tolerant stripe to ensure reconstruction of the pages of the fault tolerant stripe (i.e., the read portion of a read-modify-write operation). Once the data from the page and the redundancy metadata is read from the fault tolerant stripe, the memory sub-system modifies the data from the page and the redundancy metadata with the data item to be written and an updated redundancy metadata (i.e., the modify portion of a read-modify-write operation). In some embodiments, the fault tolerant stripe is read in order to update the redundancy metadata. After modification of the data from the page and the redundancy metadata, the memory sub-system writes the modified data to the pages that were read during the read portion of the read-modify-write operation (i.e., the write portion of a read-modify-write operation). Thus, with each host write request of a single page, the memory sub-system would need to perform at least two physical reads and two physical writes. This can cause considerable performance degradation compared to memory sub-systems that do not guarantee failure protection with redundancy metadata.

Aspects of the present disclosure address the above and other deficiencies by utilizing write cache to consolidate the host write request into a full stripe writes without evicting the stripe to the memory device.

Advantages of the present disclosure include, but are not limited to, drastically reducing the read-modify-write overhead by limiting the update and storing of the redundancy metadata until after a full stripe write.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a media write component 113 that can perform write request on a managed unit (e.g., page or data unit) of a stripe in the volatile memory device (e.g., memory device 140) and delay eviction of the stripe in the volatile memory device (e.g., memory device 140) to a stripe in the non-volatile memory device (e.g., memory device 130) until the stripe in the volatile memory device is full. In some embodiments, the memory sub-system controller 115 includes at least a portion of the media write component 113. In some embodiments, the media write component 113 is part of the host system 110, an application, or an operating system. In other embodiments, local media controller 135 includes at least a portion of media write component 113 and is configured to perform the functionality described herein.

The media write component 113 determines, based on a write request directed to a fault tolerant stripe of a plurality of fault tolerant stripes in the non-volatile memory device 130, whether a stripe is present in the volatile memory device 140. Each stripe of the plurality of stripes are stored in a content addressable memory of the volatile memory device 140. The write request refers to a request to perform a write operation at an address with the data to be written.

Each stripe is a sequence of pages (e.g., data units) in which each page can be separately addressable. Thus, the address corresponds to a page of a stripe. To determine whether the stripe is present in the volatile memory device 140, the media write component 113 obtains stripe information and a managed unit index from the address of the write request. The media write component 113 compares the stripe information of the address with a plurality of stripes stored in the content addressable memory of the volatile memory device 140. In response to matching the stripe information with a stripe of the plurality of stripes stored in the volatile memory device 140, the media write component 113 performs, based on a managed unit index, a write operation at a managed unit of the stripe of the plurality of stripes stored in the volatile memory device 140.

Each stripe in the volatile memory device 140 corresponds to a fault tolerant stripe in the non-volatile memory device 130. Each page of a fault tolerant stripe (e.g., managed unit) in memory device 130 includes a physical address. Each fault tolerant stripe further includes redundancy metadata (e.g., XOR parity) calculated based on the execution of an XOR operation on the plurality of pages and stored in the respective XOR parity of the fault tolerant stripe. Eviction of stripes stored in memory device 140 can be delayed until the stripe is full. Once the stripe is full, the media write component 113 evicts (e.g., copies) the stripe from the memory device 140 into a buffer queue which can be stored in local memory 119. The media write component 113 evicts (e.g., copies) the stripe from the buffer queue to memory device 130, responsive to the memory device 130 processing the previous stripe evicted from the buffer queue. Subsequently, once the write operations have been performed on memory device 130, the media write component 113 determines a XOR parity associated with the stripe and stores the redundancy metadata with the stripe in memory device 130. Further details with regards to the operations of the media write component 113 are described below.

Figure 2:
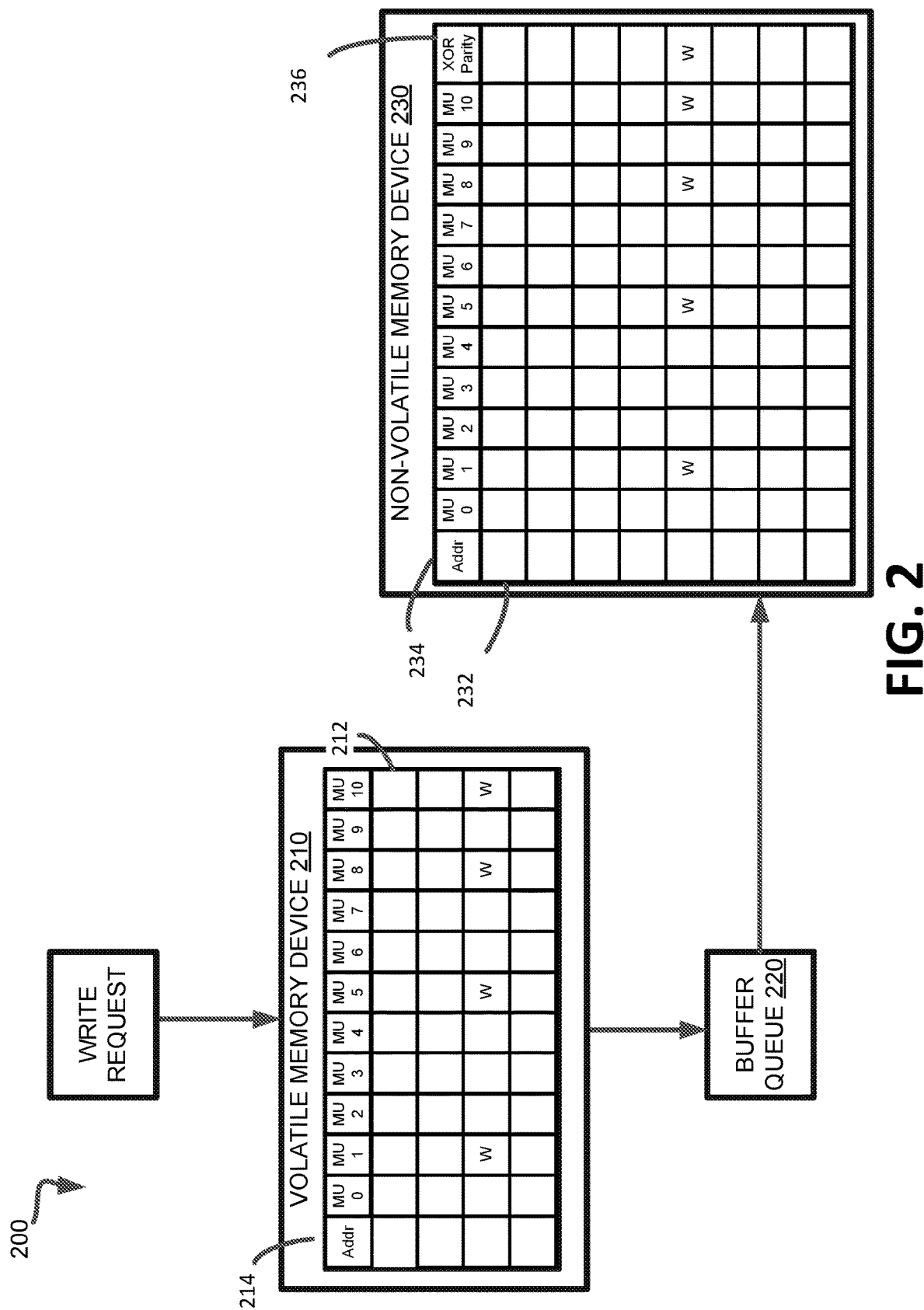
FIG. 2 is a block diagram illustrating consolidating write request in cache memory in accordance with some embodiments of the present disclosure

FIG. 2 is a block diagram 200 illustrating consolidating write request in volatile memory device 210 (e.g., cache memory). The request is received by the memory sub-system controller (e.g., memory sub-system controller 115 of FIG. 1). The write request includes an address, a command type (e.g., write or read), and data to be written. The volatile memory device 210 comprises a plurality of stripes 212. Each stripe 212 includes a plurality of data units (e.g., pages or managed units) (also referred to as "MU0-MU10") each having a logical address 214. Data items can be written to the plurality of data units with the data to be written from the write request. Once at least one stripe of the plurality of stripes 212 is full, the stripe may be evicted from the volatile memory device 210 to a buffer queue 220.

Buffer queue 220 refers to a queue of stripes received from the volatile memory device 210 which are to be sent to the non-volatile memory device 230. The non-volatile memory device 230 comprises a plurality of fault tolerant stripes 232. Each fault tolerant stripe 232 includes a logical address 234 corresponding to a plurality of data units (also referred to as "MU0-MU10"). Data items can be written to the plurality of data units. Each of the fault tolerant stripes 232 further includes a XOR parity 236 (also referred to as "redundancy metadata"). The XOR parity 236 is calculated based on the execution of an XOR operation on the plurality of data units and stored in the respective XOR parity 236 of the fault tolerant stripe 232 (e.g., XOR (MU0, MU1, MU2, MU3, MU4, MU5, MU6, MU7, MU8, MU9, MU10)). In some embodiments, the size of the plurality of stripes 212 is equivalent to the size of the plurality of fault tolerant stripes to facilitate eviction of the stripe 212 from volatile memory device 210 to non-volatile memory device 230.

Figure 3:
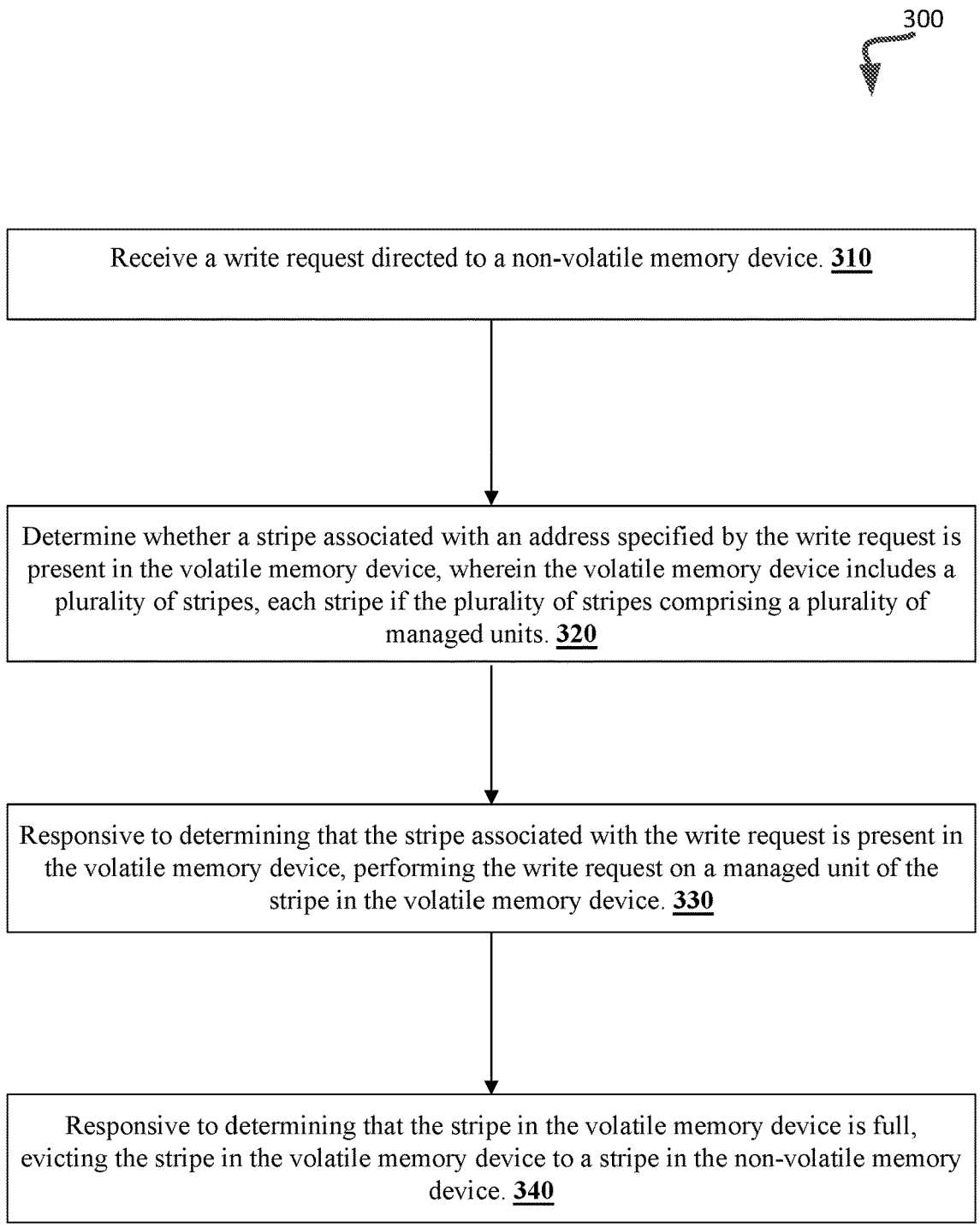
FIG. 3 is a flow diagram of an example method of performing media write operations in accordance with some embodiments of the present disclosure.

FIG. 3 is a flow diagram of an example method 300 of performing media write operations, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the media write component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receive a write request directed to a non-volatile memory device. At operation 320, the processing logic determines whether a stripe associated with an address specified by the write request is present in the volatile memory device, wherein the volatile memory device includes a plurality of stripes, each stripe of the plurality of stripes comprising a plurality of managed units. To determine that the stripe associated with the write request is present in the volatile memory device, the processing logic obtains, based on the address, a stripe information and a managed unit index to compare to a plurality of stripes stored in volatile memory device. As described previously, each stripe of the plurality of stripes are stored in a content addressable memory of the volatile memory device.

At operation 330, responsive to determining that the stripe associated with the write request is present in the volatile memory device, the processing logic performs the write request on a managed unit of the stripe in the volatile memory device. As described previously, to determine whether the stripe is present in the volatile memory device, the processing device compares a stripe information of the address with a plurality of stripes stored in the content addressable memory of the volatile memory device. To perform the write request on the managed unit of the stripe in the volatile memory device, the processing logic determines, based on the managed unit index, the managed unit of the stripe in the volatile memory device to perform the write request.

At operation 340, responsive to determining that the stripe in the volatile memory device is full, the processing logic evicts the stripe in the volatile memory device to a stripe in the non-volatile memory device. The size of the stripe in the volatile memory device and the size of the stripe in the non-volatile memory device corresponding to the volatile memory device are equivalent in size.

In some embodiments, responsive to the eviction of the stripe in the volatile memory device to the stripe in the non-volatile memory device, the processing logic copies the stripe from the volatile memory device into a buffer queue. Once the stripe is copied to the buffer queue, the processing logic copies the stripe from the buffer queue into the non-volatile memory device after a previous stripe in the buffer queue has been copied to the non-volatile memory device. Depending on the embodiment, responsive to copying the stripe from the buffer queue into the non-volatile memory device, the processing logic determines a redundancy metadata associated with the stripe of the non-volatile memory device and stores, on the non-volatile memory device, the redundancy metadata associated with the stripe of the non-volatile memory device. As described previously, the redundancy metadata reflects an XOR parity of the stripe of the non-volatile memory device.

Figure 4:
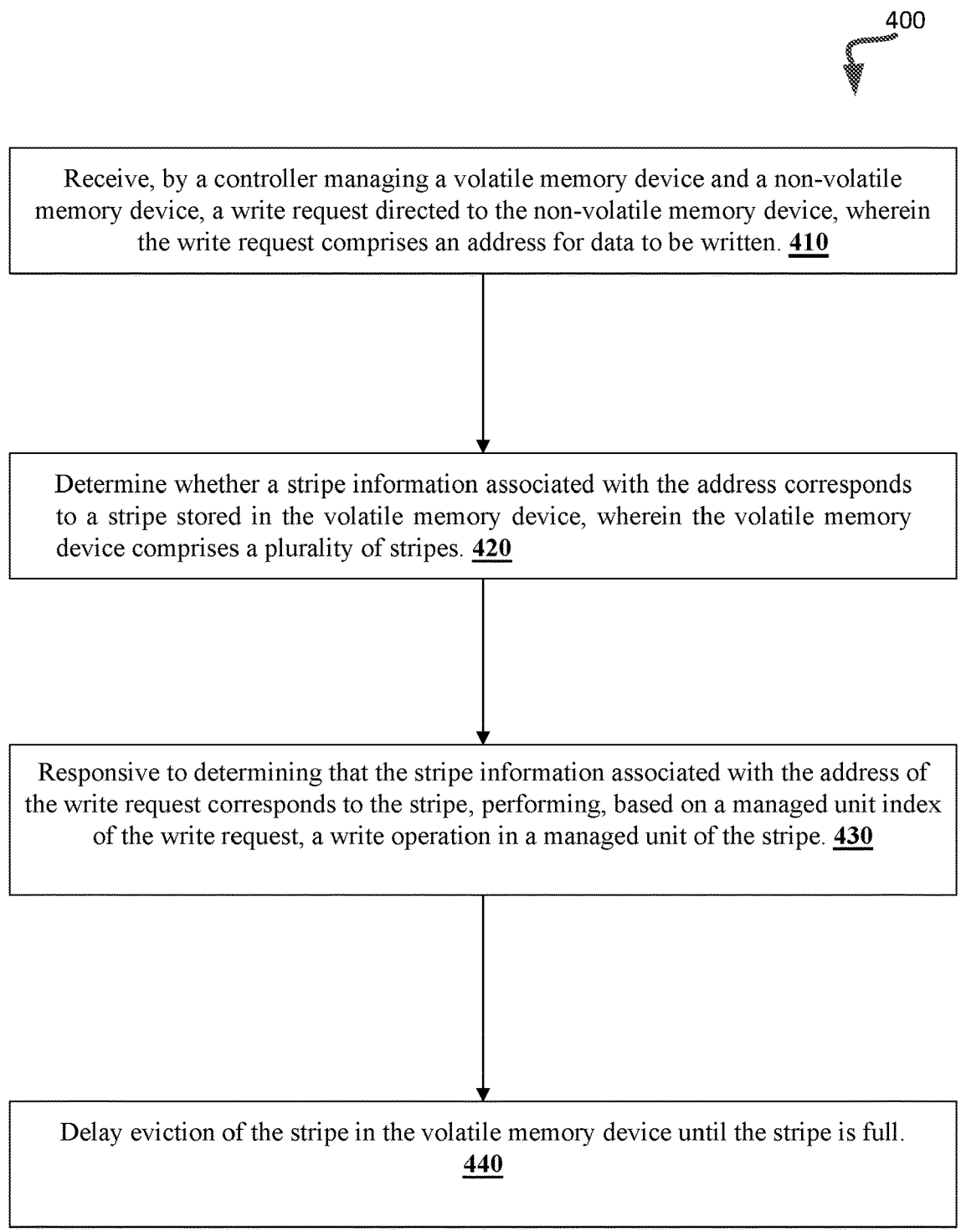
FIG. 4 is a flow diagram of another example method of performing media write operations in accordance with some embodiments of the present disclosure.

FIG. 4 is a flow diagram of another example method 400 of performing media write operations, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the media write component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives, by a controller managing a volatile memory device and a non-volatile memory device, a write request directed to the non-volatile memory device, wherein the write request comprises an address for data to be written.

At operation 420, the processing logic determines whether a stripe information associated with the address corresponds to a stripe stored in the volatile memory device, wherein the volatile memory device comprises a plurality of stripes. As described previously, to determine whether the stripe is present in the volatile memory device, the processing device compares a stripe information of the address with a plurality of stripes stored in the content addressable memory of the volatile memory device.

At operation 430, responsive to determining that the stripe information associated with the address of the write request corresponds to the stripe, the processing logic performs, based on a managed unit index of the write request, a write operation in a managed unit of the stripe.

At operation 440, the processing logic delays eviction of the stripe in the volatile memory device until the stripe is full. The size of the stripe in the volatile memory device and the size of the stripe in the non-volatile memory device corresponding to the volatile memory device are equivalent in size.

In some embodiments, responsive to eviction of the stripe in the volatile memory device, the processing logic evicts the stripe from the volatile memory device and inserts the stripe into a buffer queue. Once the stripe is inserted into the buffer queue, the processing logic evicts the stripe from the buffer queue into the non-volatile memory device after a previous stripe from the buffer queue is evicted and stored into the non-volatile memory device. Depending on the embodiment, responsive to evictions of the stripe from the buffer queue into the non-volatile memory device, the processing logic determines a redundancy metadata associated with the stripe of the non-volatile memory device and stores, on the non-volatile memory device, the redundancy metadata associated with the stripe of the non-volatile memory device. As described previously, the redundancy metadata reflects an XOR parity of the stripe of the non-volatile memory device.

Figure 5:
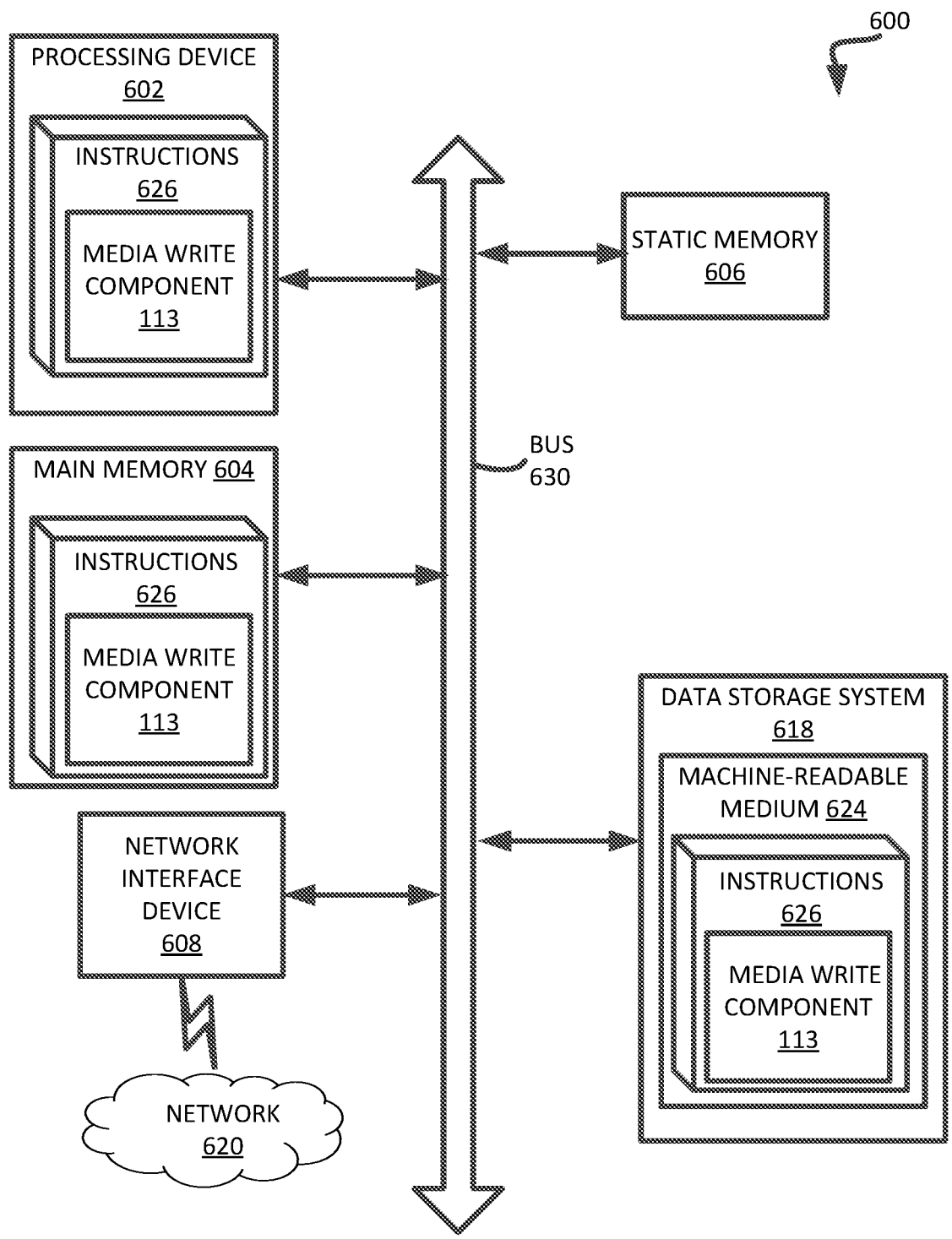
FIG. 5 is a block diagram of an example computer system in which embodiments of the present disclosure may operate.

FIG. 5 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media write component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a performance component (e.g., the media write component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a non-volatile memory device;
a volatile memory device; and
a processing device, operatively coupled with the non-volatile memory device and the volatile memory device, to perform operations comprising:
receiving a write request directed to the non-volatile memory device;
determining whether a stripe associated with an address specified by the write request is present in the volatile memory device, wherein the volatile memory device includes a plurality of stripes, each stripe of the plurality of stripes comprising a plurality of managed units;
responsive to determining that the stripe associated with the write request is present in the volatile memory device, performing the write request on a managed unit of the stripe in the volatile memory device;
responsive to determining that the stripe in the volatile memory device is full, evicting the stripe in the volatile memory device to a stripe in the non-volatile memory device;
responsive to evicting the stripe in the volatile memory device to the stripe in the non-volatile memory device, determining a redundancy metadata associated with the stripe of the non-volatile memory device; and
storing, on the non-volatile memory device, the redundancy metadata associated with the stripe of the non-volatile memory device.

2. The system of claim 1, wherein the operations further comprise:
copying the stripe from the volatile memory device into a buffer queue; and
copying the stripe from the buffer queue into the non-volatile memory device after a previous stripe in the buffer queue has been copied to the non-volatile memory device.

3. The system of claim 1, wherein the redundancy metadata reflects an exclusive or (XOR) parity of the stripe of the non-volatile memory device.

4. The system of claim 1, wherein the plurality of stripes are stored in a content addressable memory of the volatile memory device.

5. The system of claim 4, wherein determining whether the stripe associated with the write request is present in the volatile memory device further comprises:
obtaining, based on the address, a stripe information and a managed unit index; and
comparing the stripe information with a plurality of stripes stored in the volatile memory device.

6. The system of claim 5, wherein performing the write request on the managed unit of the stripe in the volatile memory device includes determining, based on the managed unit index, the managed unit of the stripe in the volatile memory device to perform the write request.

7. The system of claim 1, wherein a size of the stripe in the volatile memory device and a size of the stripe in the non-volatile memory device corresponding to the volatile memory device are equivalent in size.

8. A method, comprising:
receiving a write request directed to a non-volatile memory device;
determining whether a stripe associated with an address specified by the write request is present in the volatile memory device, wherein the volatile memory device includes a plurality of stripes, each stripe of the plurality of stripes comprising a plurality of managed units;
responsive to determining that the stripe associated with the write request is present in the volatile memory device, performing the write request on a managed unit of the stripe in the volatile memory device;
responsive to determining that the stripe in the volatile memory device is full, evicting the stripe in the volatile memory device to a stripe in the non-volatile memory device;
responsive to evicting the stripe in the volatile memory device to the stripe in the non-volatile memory device, determining a redundancy metadata associated with the stripe of the non-volatile memory device; and
storing, on the non-volatile memory device, the redundancy metadata associated with the stripe of the non-volatile memory device.

9. The method of claim 8, further comprising:
copying the stripe from the volatile memory device into a buffer queue; and
copying the stripe from the buffer queue into the non-volatile memory device after an operation corresponding to a preceding stripe is performed on the non-volatile memory device.

10. The method of claim 8, wherein the redundancy metadata reflects an exclusive or (XOR) parity of the stripe of the non-volatile memory device.

11. The method of claim 8, wherein the plurality of stripes are stored in a content addressable memory of the volatile memory device.

12. The method of claim 11, wherein determining whether the stripe associated with the write request is present in the volatile memory device further comprises:
obtaining, based on the address, a stripe information and a managed unit index; and
comparing the stripe information with a plurality of stripes stored in the volatile memory device.

13. The method of claim 12, wherein performing the write request on the managed unit of the stripe in the volatile memory device includes determining, based on the managed unit index, the managed unit of the stripe in the volatile memory device to perform the write request.

14. The method of claim 8, wherein a size of the stripe in the volatile memory device and a size of the stripe in the non-volatile memory device corresponding to the volatile memory device are equivalent in size.

15. A non-transitory computer-readable storage medium comprising instructions that, when executed by a processing device, cause the processing device to perform operations comprising:
- receiving, by a controller managing a volatile memory device and a non-volatile memory device, a write request directed to the non-volatile memory device, wherein the write request comprises an address for data to be written;
- determining whether a stripe information associated with the address corresponds to a stripe stored in the volatile memory device, wherein the volatile memory device comprises a plurality of stripes;
- responsive to determining that the stripe information associated with the address of the write request corresponds to the stripe, performing, based on a managed unit index of the write request, a write operation in a managed unit of the stripe;
- responsive to determining that the stripe in the volatile memory device is full, evicting the stripe in the volatile memory device;
- responsive to evicting the stripe in the volatile memory device to the stripe in the non-volatile memory device, determining a redundancy metadata associated with the stripe of the non-volatile memory device; and
- storing, on the non-volatile memory device, the redundancy metadata associated with the stripe of the non-volatile memory device.

16. The non-transitory computer-readable storage medium of claim 15, wherein a size of the stripe in the volatile memory device corresponding to the stripe in the non-volatile memory device are equivalent in size.

17. The non-transitory computer-readable storage medium of claim 15, wherein evicting the stripe in the volatile memory device comprises:
- evicting the stripe from the volatile memory device into a buffer queue; and
- evicting the stripe from the buffer queue into the non-volatile memory device after a previous stripe is copied into the non-volatile memory device.

* * * * *